3,846,301
TREATMENT OF SEWAGE
John H. Stokes, Caterham, England, and Alexander G. Cousins, Glasgow, Scotland, assignors to The Sanitas Company Limited, London, England
Filed Aug. 7, 1972, Ser. No. 278,251
Claims priority, application Great Britain, Aug. 10, 1971, 37,514/71; May 10, 1972, 21,883/72
Int. Cl. C02b 1/36
U.S. Cl. 210—60                    11 Claims

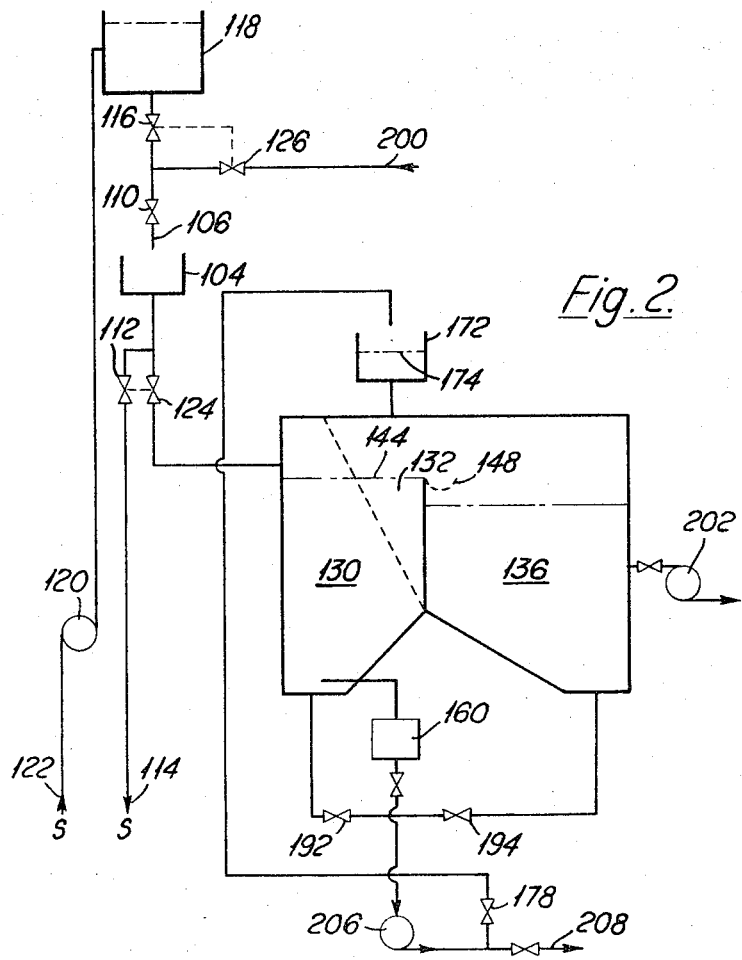
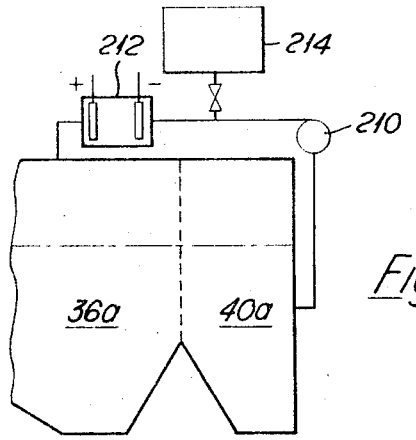
Fig.2
Fig.3

ABSTRACT OF THE DISCLOSURE

Sewage is treated by the following steps:

(a) flushing sewage from a plurality of receivers by means of flushing liquid, thus forming a mixture of liquid and sewage,
(b) separating the mixture into a part which has a high content of solid matter and a part which has a high content of liquid,
(c) substantially separating solid matter from liquid in the part with high liquid content,
(d) maintaining a chemical composition in the said liquid such that the liquid is disinfectant and deodorant,
(e) maintaining a bleaching action in the said liquid so as to have a decolorising effect,
(f) using the said liquid as flushing liquid for repetition of step (a),
(g) subjecting the part with high solid content to mechanical reduction of size of pieces of the solid matter, and
(h) thereafter holding that part in a place of storage, so that substantially all the solid matter is exposed to the chemical content of the liquid constituent of that part and is thereby broken down, dispersed, sterilised and deodorised.

---

The invention is concerned with methods and apparatus for sewage treatment which have been developed primarily for use in ships, for the purpose of avoiding the discharge of untreated sewage overboard in enclosed waters, but which may be used in other circumstances, especially where there are restrictions on disposal of effluent or on water supply, for example in mines, in deep air-raid shelters, or in hospitals for infectious diseases.

In methods according to the present invention sewage is treated by the following steps:

(a) flushing sewage from a plurality of receivers by means of flushing liquid, thus forming a mixture of liquid and sewage,
(b) separating the mixture into a part which has a high content of solid matter and a part which has a high content of liquid,
(c) substantially separating solid matter from liquid in the part with high liquid content,
(d) maintaining a chemical composition in the said liquid such that the liquid is disinfectant and deodorant,
(e) maintaining a bleaching action in the said liquid so as to have a decolorising effect,
(f) using the said liquid as flushing liquid for repetition of step (a),
(g) subjecting the part with high solid content to mechanical reduction of size of pieces of the solid matter, and
(h) thereafter holding that part in a place of storage, so that substantially all the solid matter is exposed to the chemical content of the liquid constituent of that part and is thereby broken down, dispersed, sterilised and deodorised.

Preferably the liquid used for flushing is maintained disinfectant and deodorant by maintaining available caustic alkali in the said liquid, at a concentration not exceeding 1%.

The present invention produces certain advantages beyond those produced by the method which is the subject of U.S. Pat. No. 3,401,115.

In particular, in the method of the present invention, the majority of the solid constituent of human wastes, together with paper, passes into the place of storage, and therefore the decolorising action needs only to be applied to the relatively small amount of solid matter which may be in the part with high liquid content. Of course the decolorising action is also applied to the liquid in this part, but the total demand for decolorising action is considerably less, and consequently the consumption of chemicals is reduced.

A chlorine releasing agent is a preferred means for effective decolorisation. This satisfies the requirement that it has a bleaching action in alkaline conditions. It is now found convenient to use calcium hypochlorite for this purpose, but lithium hypochlorite or sodium hypochlorite could be used. Insoluble calcium salts may be produced from calcium hypochlorite, and these should preferably be separated from the liquid. The reduction in the need for decolorising action means that the amount of insoluble calcium salts to be separated is considerably less.

Because the part with high liquid content contains a relatively small proportion of solids, it is found that there is less tendency for cloudiness to be produced in the flushing liquid if a ship in which the method is being carried out is subjected to a rolling motion.

As alternatives to the use of a hypochlorite, the chlorination may be effected by the employment of chloramines, and similar substances capable of yielding active chlorine, or by a chlorinating unit utilising liquid chlorine, or by electrolysis. Such methods would largely obviate the production of insoluble calcium salts.

The concentration of available caustic alkali maintained in the liquid which is used for flushing is preferably of the order of 0.2% weight/volume. This is sufficient to ensure that the flushing liquid is sterile and safe for its purpose.

It is preferred to add more of the caustic alkali to the part with high solid content, for example so that the available caustic alkali in the place of storage is of the order of 0.5% weight/volume. This higher concentration produces a more rapid breaking down and dispersing action, and thus prevents anaerobic decomposition.

A sewage handling system according to the invention comprises:

(a) a plurality of receivers for sewage, having respective inlets for flushing liquid and respective outlets for a mixture of liquid and sewage,
(b) a separator having an inlet which is connected to the outlets of the receivers and containing a device capable of separating the mixture into a part which has a high content of solid matter and a part which has a high content of liquid,
(c) a settling tank arranged to receive the part with high liquid content from the separator and to discharge liquid through a fine screen to an outlet, which is connected to the inlets of the receivers,
(d) a storage tank,
(e) a comminutor or macerator arranged to receive the part with high solids content from the separator and to discharge that part into the storage tank, and
(f) means for introducing chemicals into the separator or settling tank.

Such a system can consist of standard toilets, flushing valves and piping, and drain piping, connected up appropriately to apparatus consisting of:

(a) a separator having an inlet for receiving a mixture of sewage and flushing liquid and containing a device capable of separating the mixture into a part which has a high content of solid matter and a part which has a high content of liquid;

(b) a settling tank arranged to receive the part with high liquid content from the separator and to discharge liquid through a fine screen to an outlet;

(c) a comminutor or macerator arranged to receive the part with high solids content from the separator and to discharge that part into a second outlet; and (d) means for introducing chemicals into the separator or settling tank.

To complete the system a storage tank is required, also connected up appropriately to the apparatus.

Preferably the separating device is a stationary screen, but other devices are possible, for example a moving screen.

The invention will now be described in more detail in the course of description of some examples, with reference to the accompanying drawings in which:

FIG. 2 is a circuit diagram of subsidiary apparatus for the forward accommodation in a ship;

FIG. 3 is a fragmentary diagram of a modification of FIG. 1;

Figure 1:
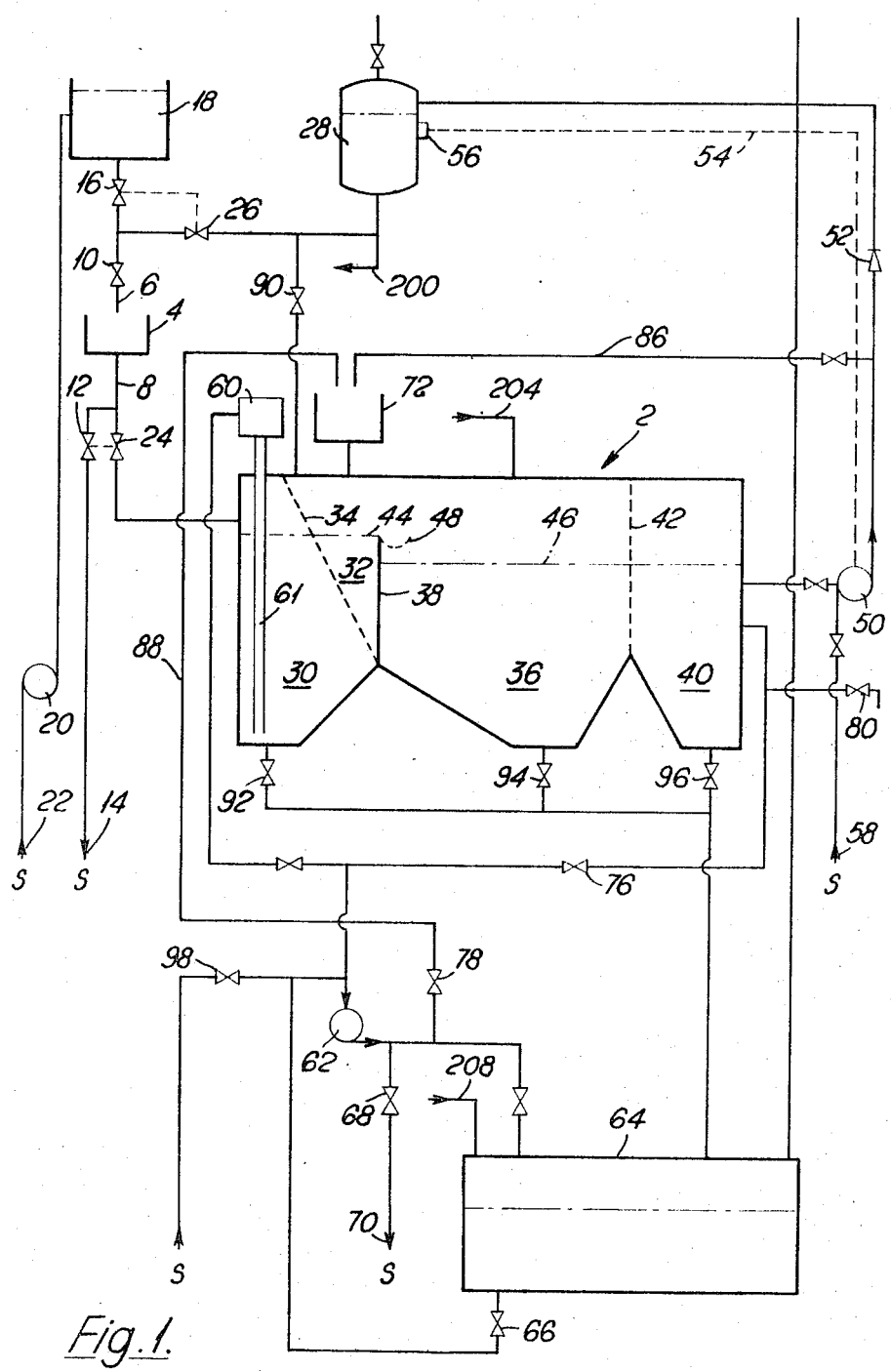
FIG. 1 is a circuit diagram of the main apparatus in a ship.

FIGS. 1 and 2 relate to an arrangement for a ship in which part of the accommodation, together with the engine room, is in the aft portion of the ship, while further accommodation is in a forward portion. The main apparatus shown in FIG. 1 is in the aft portion, and the assembly of tanks 2 in which treatment is carried out is conveniently installed in the engine room.

In various parts of the accommodation, there are water closets and urinals, indicated generically at 4. These receive liquid for flushing through a pipe 6, and are drained through a pipe 8. The branches to the individual water closets and urinals, and the various individual valves 10 to control flushing, are not shown, for the sake of simplicity. In the rest of this description, the generic expression "the receivers" will be used in reference to the water closets and urinals.

When the ship is in open waters, where the discharge of crude sewage overboard is permissible, the pipe 8 is connected through a valve 12 to a discharge into the sea at 14. In the drawings, all connections to or from the sea are indicated by S. At the same time, the pipe 6 is supplied through a valve 16 from a tank 18 which is kept charged with salt water by a pump 20 having its inlet connected to the sea at 22.

In enclosed waters, the valves 12 and 16 are shut, and valves 24 and 26 are opened. The valve 26 connects the pipe 6 to a supply tank 28 in which is a quantity of flushing liquid confined under pressure, as described in more detail below.

The mixture of sewage and flushing liquid from the receivers 4 passes through the valve 24 into the assembly of tanks 2. The mixture is delivered into a compartment 30, which is separated from a compartment 32 by a screen 34. The compartment 32 is divided from the compartment 36 by a weir 38. The compartment 36 is separated from a compartment 40 by a screen 42. Before the system is put into use, the tank system is partly filled with liquid, namely sea-water or fresh water to which is added a preparation known as "E.C.1.," so that the liquid surface levels are as indicated at 44 and 46. The preparation E.C.1. contains caustic soda and is in solid form. It is obtainable from Elsan Sewage Systems Ltd., London, England.

In operation, the compartments 30 and 32 and the screen 34 act as a separator, and thus, of the mixture of sewage and liquid entering the compartment 30, a part having a high content of liquid passes through the screen to the compartment 32, and then overflows the weir 38 to enter the compartment 36, while a second part, containing a high content of solid matter, remains in the compartment 30. The amount of solid matter in the compartment 30 progressively increases, until it is removed as described below.

A suitable form of screen 34 is made up of parallel bars, the width of the gaps between the bars being about 6 mm. The placing of the screen at an inclination, as indicated in FIG. 1 is found to assist its action. The inclination of the screen is chosen to suit the hydraulic flow.

The small amount of solid matter which necessarily passes through the screen 34 is substantially all broken down, dispersed, sterilised, and deodorised in the compartment 36 by the action of E.C.1. in solution, while the very small amount of residual solids settles to the bottom of the compartment 36. Floc or insoluble powder is retained by the screen 42, so that liquid substantially free of solids reaches the compartment 40. A suitable fineness for the screen 42 is that known as "200 mesh" BSS.

The solids which are broken down and dispersed in the compartment 36 may have a tendency to discolour the liquid. This is counteracted by a bleaching action, which is produced by causing the liquid which passes over the weir 38 to pass through a basket 48 against the downstream side of the weir, which is kept supplied with tablets of a preparation known as "E.C.2." These tablets are gradually dissolved away by the liquid, and are replenished from time to time through an access door (not shown). The preparation E.C.2., which contains calcium hypochlorite, is obtainable from Elsan Sewage Systems Ltd., London, England. As a result of the action of E.C.1. and E.C.2., the liquid which reaches the compartment 40 is substantially free of colour although it may not be entirely transparent. The rate of consumption of E.C.2. depends on the rate of supply, and the rate of supply is adjusted so as to produce an aesthetically acceptable flushing liquid. The fact that the solid matter has already encountered E.C.1. before it encounters the E.C.2. makes conditions more favourable for the action of the E.C.2.

Figure 5:
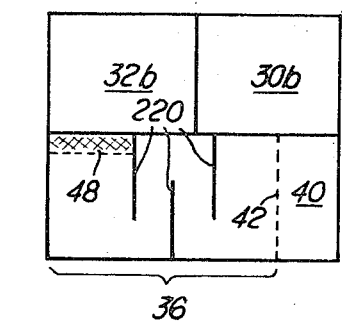
FIG. 5 is a fragmentary plan.

In order to ensure that all of the liquid passing through the compartment 36 remains there for sufficient time for the decolorising action to be effective, the compartment may contain baffles (as indicated at 220 in FIG. 5, referred to below) arranged so that, as seen looking downwards onto the compartment 36, the liquid is obliged to flow along a sinuous path.

Liquid in the compartment 40 is used to replenish the supply in the pressurised tank 28, being delivered from time to time by a pump 50 through a non-return valve 52. The broken line 54 indicates that the operation of the pump 50 may be controlled automatically in response to a device 56 which senses the pressure or the level of liquid in the tank 28.

The system may initially be filled with sea-water by connecting the intake of the pump 50 to the sea at 58.

From time to time, the contents of the compartment 30 are withdrawn, and passed through a comminutor or macerator 60 and a pump 62 to a storage tank 64, referred to in marine engineering as a "sullage tank." By the action of the comminutor or macerator 60, substantially all the solid matter which was in the part with high solid content produced by the separator 30, 32, 34 is exposed to the caustic alkali, and then by the action of the caustic alkali substantially all the solid matter is broken down, dispersed, sterilised, and deodorised, while remaining in the storage tank 64. Preferably, as described below, the concentration of E.C.1., in the tank 64 is maintained at a higher level than elsewhere in the system.

Preferably, as shown, the comminutor or macerator 60 is arranged above the compartment 30, with a pipe 61 of large diameter leading upwards from the lower part of the compartment 30 to the comminutor. In such a pipe an elutriating action occurs; that is to say solid objects of high specific gravity, e.g. pieces of metal or stone, are left behind by the liquid and the lighter solids, and thus the comminutor is protected from damage by hard objects.

Conveniently the macerator or comminutor 60 is operated once a day. The amount of liquid accompanying the solids is preferably roughly equal to the amount of urine received into the system. That is to say, in the mixture withdrawn from the compartment 30 the ratio by volume of solid matter to liquid is about 4 to 26. This can be achieved by choice of the size of the compartment 30 to match the expected number of people using the system. If there is a tendency over several days for the liquid level in the compartments 36, 40 to rise or to fall, this is corrected by either letting out liquid into the storage tank, or by adding water.

The capacity of the storage tank 64 is determined with reference to the maximum number of people to be accommodated on the ship and the period of time between opportunities for emptying the storage tank 64, either by discharge into the open sea, by discharge into a shore disposal installation, or by delivery to a burner of a boiler or incinerator on the ship itself. The discharge, when required, takes place by operating the pump 62 with valves 66 and 68 open, the discharge point 70 being appropriately connected.

The content of caustic alkali in the main system is established and maintained by, from time to time, e.g. once a day, placing an appropriate quantity of E.C.1. into a small tank 72 above or in the compartment 32. The pump 62 is operated for about 20 minutes with valves 76 and 78 open, so that liquid is drawn from the compartment 40, and discharged into the tank 72. Caustic soda solution then runs down from the tank 72 into the compartment 32. During use of the system, the concentration of caustic alkali should be checked once a day, e.g. by drawing off a sample from the compartment 40 through a valve 80, and carrying out a titration to indicate the content of free caustic alkali. It is desirable that this content should be maintained at about 0.2% weight/volume. The pH is not significant, and is influenced by irrelevant factors such as the presence of carbonates.

If at any time through inadvertence the concentration of caustic alkali becomes unduly high, then some liquid should be drawn off from the tank system 2 into the storage tank 64, and replaced by water.

Additional amounts of E.C.1. are supplied to the compartment 30 immediately before each withdrawal of its contents, in order to maintain a concentration in the storage tank 64 of about 0.5% weight/volume available caustic alkali.

The pipe 86 is an alternative to the basket 48, enabling the small tank 72 to be used for E.C.2. as well as for E.C.1. If the pipe 86 is used, and a supply of E.C.2. is maintained in the tank 72, then E.C.2. solution is automatically delivered into the compartment 32 each time the pump 50 operates to replenish the flushing liquid in the tank 28. This means that the amount of E.C.2. is roughly proportioned to the amount of use made of the receivers 4.

When the system is first being put into use, a valve 90 is opened to permit liquid to be circulated through the tank assembly 2 by means of the pump 50 so as to distribute chemicals initially throughout the system. Normally this valve 90 is shut.

The compartments 30, 36 and 40 each have an outlet at the bottom controlled by respective valves 92, 94, 96 and leading to the storage tank 64. Moreover the pump 62 has a sea-water intake controlled by a valve 98. These arrangements enable the system to be cleaned out from time to time, in particular for transferring solids from the compartment 36 to the storage tank 64. Any hard objects in the compartment 30 are removed through an inspection door (not shown).

The subsidiary apparatus shown in FIG. 2 corresponds to part of the apparatus shown in FIG. 1, and corresponding components are indicated by the same reference numerals with 100 added.

Flushing liquid is supplied from the tank 28 in the main apparatus through a pipe 200 (shown in both FIGS.). Liquid from the compartment 136 is returned by a pump 202 and a pipe 204 to the compartment 36 in the main apparatus. Solids and a small amount of liquid are transferred by a pump 206 and a pipe 208 to the storage tank 64 in the main apparatus.

FIG. 3 shows a modification of the means for providing chlorination. The basket 48 is omitted.

Liquid from the compartment 40a is circulated by a pump 210 through an electrolytic cell 212, from which liquid is returned to the compartment 36a. In the cell 212, chlorine is produced by electrolytic action from sodium chloride. This sodium chloride may be present in sufficient quantities as a result of the system having been filled with sea-water. Alternatively, particularly if the system has been filled with fresh water, it may be necessary to provide a supply of brine to the cell 212 from a tank 214. In the cell 212, the chlorine is not given off as a gas, but goes into solution in the liquid and may also form compounds in solution in the liquid. As a consequence, the liquid returning from the cell 212 to the compartment 36a has a chlorinating action on solid matter, and thus decolorises the liquid reaching the compartment 40a.

Figure 4:
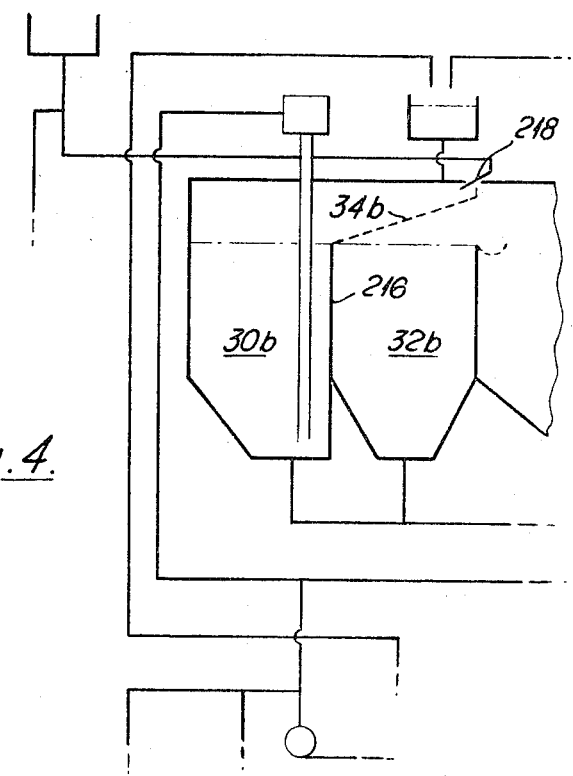
FIG. 4 is a fragmentary diagram of another modification of FIG. 1.

In the modification shown in FIG. 4, the compartments 30, 32 and screen 34 are replaced by compartments 30b, 32b and a screen 34b. The screen 34b is above the compartment 32b and slopes downwards to the top of a wall 216 which is at about the same level as the top of the wall 38 (which is unchanged). The mixture of sewage and flushing liquid is delivered onto the upper face of the upper edge of the screen 34b, at 218, flowing down the slope of the screen. Most of the liquid passes through the screen into the compartment 32b. Most of the solid matter passes down the upper face of the screen, and enters the compartment 30b. When the contents of the compartment 30b are withdrawn, the amount of liquid accompanying the solid matter is less than with the arrangement shown in FIG. 1. Hence it is necessary also to let out liquid from time to time from the settling tank to the storage tank.

The compartments are shown diagrammatically in a single row. In a practical arrangement this is not necessary. For example the compartments may be produced by dividing a tank, as seen in plan, in the manner indicated in FIG. 5.

We claim:
1. A method of treating sewage comprising the steps of:
(a) flushing sewage from a plurality of receivers by means of flushing liquid, thus forming a mixture of flushing liquid, and sewage,
(b) separating the mixture into a first part which has a high content of solid matter and a low content of liquid and into a second part which has a high content of liquid,
(c) after step (b) separating, at a separation zone, said second part into a solid matter portion and a liquid portion,
(d) maintaining a caustic alkali chemical composition in said liquid portion at a concentraton not exceeding one percent such that said liquid portion is disinfectant and deodorant,
(e) maintaining a bleaching action in said liquid portion so as to have a decolorising effect,

(f) using said liquid portion as said flushing liquid for repetition of step (a), (g) after step (b) conveying the first part away from said separation zone to a comminution zone remote from said separation zone and subjecting said first part to mechanical reduction of the size of the pieces of the solid matter thereof, (h) providing a storage zone remote from said separation zone for storage of the solid matter;

(i) after step (g), conveying the first part high in solid content from said comminuting zone to said storage zone whereby substantially all of the solid matter of said first part is subjected to the chemical content of the liquid content thereof and is thereby broken down, dispersed, sterilised and deodorised; and (j) transferring said solid matter portion separated from said second part to said storage zone.

2. A method according to claim 1, in which more of the caustic alkali is added to said first part.

3. A method according to claim 1, in which the bleaching action is produced by introducing a water-soluble chlorinating compound into the liquid portion.

4. A method according to claim 3, in which the compound is calcium hypochlorite.

5. A method according to claim 1, in which sodium chloride is present in the said liquid and the bleaching action is produced by electrolysis of the said liquid.

6. A method according to claim 2 wherein alkali is maintained at a level of about 0.5% weight/volume in said first part.

7. A sewage handling system comprising:

(a) a plurality of receivers for sewage, having respective inlets for flushing liquid and respective outlets for a mixture of liquid and sewage, (b) a separator having an inlet which is connected to the outlets of the receivers and containing a device capable of separating the mixture into a first part which has a high content of solid matter and a low content of liquid and into a second part which has a high content of liquid, (c) a settling tank in fluid communication with said separator arranged to receive said second part from the separator and to discharge liquid through a fine screen to an outlet which is connected to the inlets of the receivers, (d) a storage tank remote from said settling tank, (e) means including a comminutor or macerator in fluid communication with said separator and said storage tank and arranged to receive said first part with high solids content from the separator and to discharge the comminuted or macerated first part into the storage tank, (f) means for introducing caustic alkali into one of said separator and settling tank; and (g) means for conveying the liquid portion of said second part from said settling tank outlet to said receivers.

8. Apparatus according to claim 7, in which the separator comprises an inclined screen, and the inlet to the separator is arranged to direct the mixture onto the upper face of the screen near its highest point, the separator including a first compartment beneath the screen and a second compartment arranged to receive solid matter passing off the lowest point of the upper face of the screen.

9. Apparatus according to claim 7, in which the separator includes a compartment for the part with high solids content, and the comminutor or macerator is above said compartment, and further comprising a pipe of large diameter leading upwards from said compartment to the inlet of the comminutor or macerator.

10. Apparatus according to claim 7, in which there is a weir over which the part with high liquid content passes from the separator to the settling tank, and further comprises a basket located against the downstream side of the weir in which a water-soluble bleaching chemical preparation is placed.

11. Apparatus according to claim 7, including an electrolytic cell, and means for circulating liquid from the outlet of the settling tank, through the cell, and back to the settling tank.

References Cited
UNITED STATES PATENTS

| | | | |
|---|---|---|---|
| 3,401,115 | 9/1968 | Meyer et al. | 210—152 |
| 3,510,000 | 5/1970 | Carlson | 210—152 |
| 3,223,242 | 12/1965 | Murray | 210—169 |
| 3,673,614 | 7/1972 | Claunch | 210—152 |
| 3,655,048 | 4/1972 | Pergola | 210—152 |

SAMIH N. ZAHARNA, Primary Examiner

B. CASTEL, Assistant Examiner

U.S. Cl. X.R.

210—62, 152, 202, 206